(12) United States Patent
Krishnaswamy et al.

(10) Patent No.: US 9,507,405 B2
(45) Date of Patent: Nov. 29, 2016

(54) SYSTEM AND METHOD FOR MANAGING POWER IN A CHIP MULTIPROCESSOR USING A PROPORTIONAL FEEDBACK MECHANISM

(71) Applicant: Oracle International Corporation, Redwood City, CA (US)

(72) Inventors: Venkatram Krishnaswamy, Los Altos, CA (US); Georgios K Konstadinidis, San Jose, CA (US); Sebastian Turullols, Los Altos, CA (US); Yifan YangGong, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 167 days.

(21) Appl. No.: 14/308,079

(22) Filed: Jun. 18, 2014

(65) Prior Publication Data

US 2015/0370303 A1 Dec. 24, 2015

(51) Int. Cl.
*G06F 1/32* (2006.01)
(52) U.S. Cl.
CPC ............ *G06F 1/324* (2013.01); *G06F 1/3243* (2013.01)
(58) Field of Classification Search
CPC .................. G06F 1/3206; G06F 1/324
See application file for complete search history.

(56) References Cited

U.S. PATENT DOCUMENTS

| | | | |
|---|---|---|---|
| 6,564,328 B1 * | 5/2003 | Grochowski | ......... G06F 1/3203 712/E9.049 |
| 7,111,182 B2 | 9/2006 | Gary | |
| 2005/0062507 A1 * | 3/2005 | Naffziger | ............ H03L 7/07 327/105 |
| 2009/0019243 A1 * | 1/2009 | Hur | ........... G06F 1/3225 711/158 |
| 2009/0070607 A1 * | 3/2009 | Safford | ............ G06F 1/3234 713/320 |
| 2009/0217277 A1 | 8/2009 | Johnson et al. | |
| 2010/0185882 A1 | 7/2010 | Arnold et al. | |
| 2013/0080795 A1 * | 3/2013 | Sistla | ............ G06F 1/324 713/300 |
| 2015/0006925 A1 * | 1/2015 | Branover | ............ G06F 1/3206 713/320 |

OTHER PUBLICATIONS

M.S. Floyd et al., "System power management support in the IBM POWER6 microprocessor", IBM J. Res. & Dev. vol. 51, No. 6, Nov. 2007, 14 pages.

* cited by examiner

*Primary Examiner* — Thomas Lee
*Assistant Examiner* — Chad Erdman
(74) *Attorney, Agent, or Firm* — Meyertons, Hood, Kivlin, Kowert & Goetzel, P.C.

(57) ABSTRACT

A system includes a power management unit that may monitor the power consumed by a processor including a plurality of processor core. The power management unit may throttle or reduce the operating frequency of the processor cores by applying a number of throttle events in response to determining that the plurality of cores is operating above a predetermined power threshold during a given monitoring cycle. The number of throttle events may be based upon a relative priority of each of the plurality of processor cores to one another and an amount that the processor is operating above the predetermined power threshold. The number of throttle events may correspond to a portion of a total number of throttle events, and which may be dynamically determined during operation based upon a proportionality constant and the difference between the total power consumed by the processor and a predetermined power threshold.

18 Claims, 3 Drawing Sheets

SYSTEM AND METHOD FOR MANAGING POWER IN A CHIP MULTIPROCESSOR USING A PROPORTIONAL FEEDBACK MECHANISM

BACKGROUND

1. Technical Field

This disclosure relates to processing systems, and more particularly to power management in multi-core processing systems.

2. Description of the Related Art

As modern processor performance has increased, there has been a concomitant increase in the power consumed by these processors. The increased power consumption has become problematic in at least a couple of ways. An increase in power consumption in a portable device leads to lower battery life, which is highly undesirable in portable electronics. In addition, increased power consumption means an increased thermal load on cooling mechanisms. The increase in heat may be particularly problematic in chip multi-processors, which have multiple processor cores housed in a single package or housing. Therefore, while a continual increase in performance has been a driving factor in processor development, it has also become necessary to find ways of reducing the power consumed by a processor while sacrificing as little performance as possible.

Accordingly, processor designers have proposed many ways to reduce power. One such way is to throttle, or slow down, a processor operating frequency during times that may be imperceptible to a user. However, depending on the applications being executed by a processor, throttling imperceptibly may not be an option. Similarly, degradation in performance may also not be acceptable.

SUMMARY OF THE EMBODIMENTS

Various embodiments of a system and method of managing power in a chip multiprocessor are disclosed. Broadly speaking, the system includes a processor having a number of processor cores that execute program instructions and a power management unit that may monitor the power consumed by the processor cores and any logic within the processor. The power management unit may throttle or reduce the operating frequency of the processor cores by applying a number of throttle events in response to determining that the processor is operating above a predetermined power threshold during a given monitoring cycle. The number of throttle events may be based upon a relative priority of each of the plurality of processor cores to one another and an amount that the processor is operating above the predetermined power threshold. In particular, the number of throttle events may correspond to a portion of a total number of throttle events, which may be dynamically determined during operation based upon a proportionality constant and the difference between the total power consumed by the processor and a predetermined power threshold.

In one embodiment, a system includes a number of processor cores that execute program instructions. The system may also include a power management unit that may throttle the operating frequency of each of a subset of the plurality of processor cores by a predetermined number of throttle events in response to determining that the processor is operating above a predetermined power threshold during a given monitoring cycle. The predetermined number of throttle events is based upon a relative priority of each of the plurality of processor cores to one another and an amount that the processor is operating above the predetermined power threshold.

In one specific implementation, the predetermined number of throttle events may correspond to a portion of a total number of throttle events, and the total number of throttle events may be dynamically determined during operation based upon a proportionality constant and the difference between the total power consumed by the processor and a predetermined power threshold.

Figure 1:
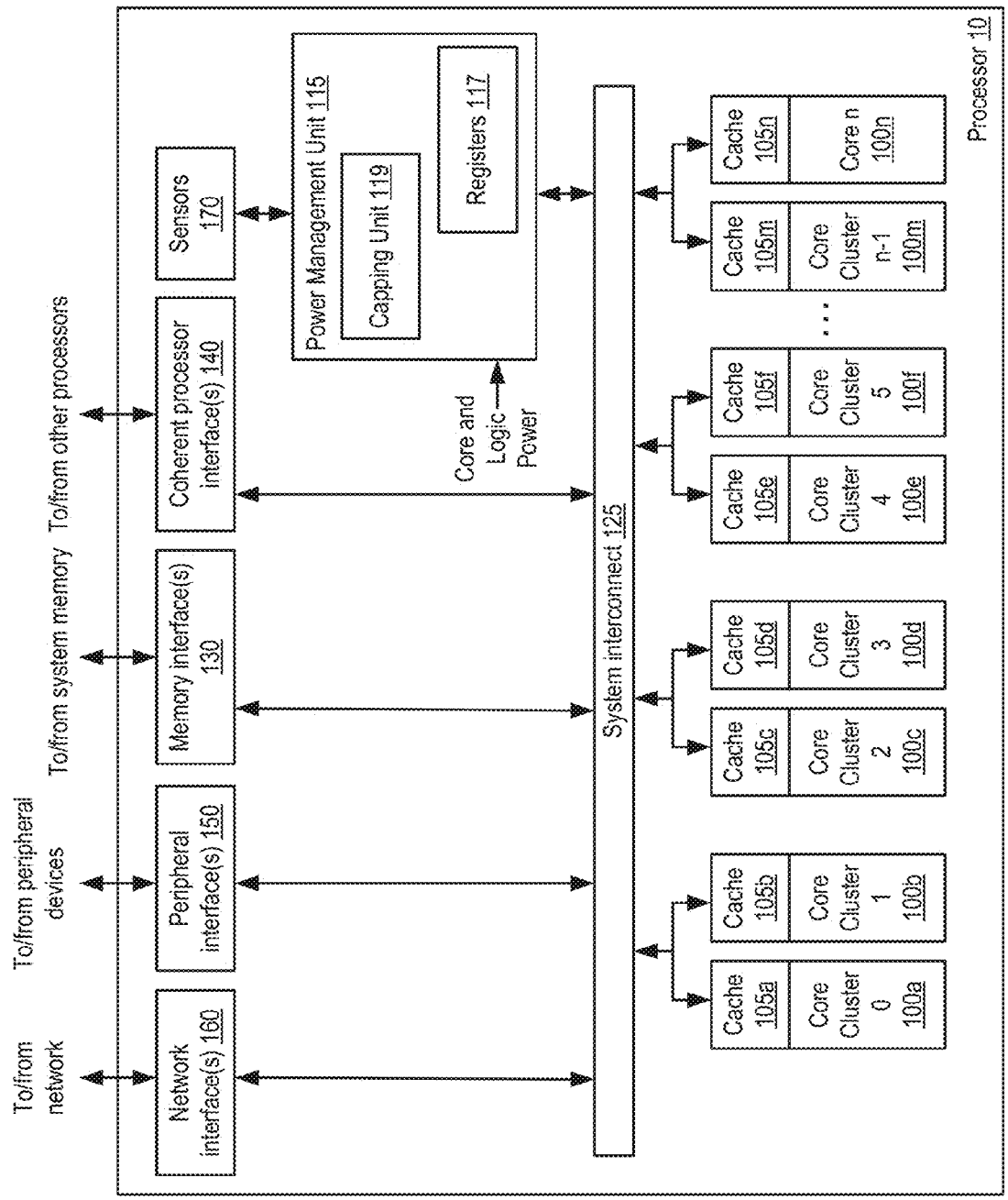
FIG. 1 is a block diagram of one embodiment of a multicore processor.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f), interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Turning now to FIG. 1, a block diagram of one embodiment of a processor 10 is shown. In the illustrated embodiment, processor 10 includes a number of processor core clusters 100a-n, which are also designated "core cluster 0" though "core cluster n." Various embodiments of processor 10 may include varying numbers of cores 200, such as 8, 16, or any other suitable number. Each of the core clusters 200 is coupled to a corresponding cache 105a-n, which is in turn coupled to a system interconnect 125. Core clusters 100a-n and caches 105a-n may be generically referred to, either collectively or individually, as core(s) 100 and cache(s) 105, respectively. The system interconnect 125 is further coupled to a number of interfaces described further below and to a power management unit 115.

In one embodiment, each core cluster 100 may include a number of processor cores, and each core with a cluster may be configured to execute instructions and to process data according to a particular instruction set architecture (ISA). In one embodiment, each core 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of the core clusters 100 may be configured to operate independently of the others, such that all core clusters 100 may execute in parallel. Additionally, as described below in conjunction with the description of FIG. 3, in some embodiments, each of the cores within a given core cluster 200 may be configured to execute multiple threads concurrently, where a given thread may include a set of instructions that may execute independently of instructions from another thread. For example, an individual software process, such as an application, may consist of one or more threads that may be scheduled for execution by an operating system. Such a core 100 may also be referred to as a multithreaded (MT) core. In one embodiment, each of cores 200 may be configured to concurrently execute instructions from a variable number of threads.

Additionally, as described in greater detail below, in some embodiments, each of the cores within a core cluster 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., a cache miss), the later instructions may execute before the given instruction completes, which may improve overall performance of the executing thread.

In one embodiment, a given cache 105 may be representative of any of a variety of high-speed memory arrays of recently accessed data or other computer information and is typically indexed by an address. Each cache 105 may include both level 2 (L2) and level 3 (L3) cache memory that may be shared among the processor cores within a core cluster 100. As such, in various embodiments the L2 caches may be configured as set-associative, writeback caches that are fully inclusive of first-level cache state (e.g., instruction and data caches within core 200). To maintain coherence with first-level caches, embodiments of the L2 caches may implement a coherence protocol (e.g., the MESI protocol) to maintain coherence with other caches within processor 10. In addition, the L3 caches may be organized into a number of separately addressable banks that may each be independently accessed, such that in the absence of conflicts, each bank may concurrently return data to a respective L2 cache. In some embodiments, each individual bank may be implemented using set-associative or direct-mapped techniques. In some embodiments, each L3 cache may implement queues for requests arriving from system interconnect 125 and for results sent to system interconnect 125. Additionally, in some embodiments each L3 cache may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). Each L3 cache may variously be implemented as single-ported or multi-ported (i.e., capable of processing multiple concurrent read and/or write accesses).

Via the system interconnect 125 and cache 105, core clusters 100 may be coupled to a variety of devices that may be located externally to processor 10. In the illustrated embodiment, one or more memory interface(s) 130 may be coupled to one or more banks of system memory (not shown). One or more coherent processor interface(s) 140 may be configured to couple processor 10 to other processors (e.g., in a multiprocessor environment employing multiple units of processor 10). Additionally, system interconnect 125 may couple core clusters 100 to one or more peripheral interface(s) 150 and network interface(s) 160.

Not all external accesses from core clusters 100 necessarily proceed through the L3 cache within caches 105. Accordingly, the system interconnect 125 may also be configured to process requests from core clusters 100 for non-cacheable data, such as data from I/O devices as described below with respect to peripheral interface(s) 150 and network interface(s) 160.

Memory interface 130 may be configured to manage the transfer of data between caches 105 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 230 may be configured to support interfacing to multiple different types of system memory.

In the illustrated embodiment, processor 10 may also be configured to receive data from sources other than system memory. System interconnect 125 may be configured to provide a central interface for such sources to exchange data with core clusters 100 and/or caches 105. In some embodiments, system interconnect 125 may be configured to coordinate Direct Memory Access (DMA) transfers of data to and from system memory. For example, via memory interface 230, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 250 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments, peripheral interface 250 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 260 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 260 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

In one embodiment, the power management unit 115 may be configured to monitor various power attributes on the processor 10 and to implement and control one or more power capping policies. More particularly, as described in greater detail below the power management unit 115 may concurrently provide power capping, current capping, and temperature capping on processor 10 using various power, current and temperature measurements provided by sensors 170 and other chip logic. Capping may refer to providing an upper limit for a parameter being monitored. For example, power capping may refer to preventing or stopping the processor from exceeding a predetermined power threshold, as described further below.

In the illustrated embodiment, the power management unit 115 includes a number of programmable registers 117 and a capping unit 119. The programmable registers 117 may be configured to store various power management values that may be used by the capping unit 119. In one embodiment, the capping unit 119 may implement a proportional feedback algorithm (shown below in the pseudo code example) that may be configured to track whether or not the processor 10 is operating above or below a predetermined power threshold, and to throttle or resume one or more of the processor core clusters 100 dependent upon whether the processor 10 is operating above or below the power threshold. It is noted that the term "throttle" refers to reducing an operating clock frequency of one or more of the processor cores within a core cluster 105. Thus, a throttle event may refer to reducing the operating clock frequency by a predetermined amount. The term "resume" refers to increasing the operating clock frequency of the processor cores within a core cluster 105 subsequent to a processor core cluster being throttled. More particularly, in one embodiment the power management unit 115 may be programmed by a system administrator to throttle and resume the core clusters 100 proportionate to a relative priority of each core cluster 105 to the other core clusters 105, and based upon how much the processor 10 is above or below the power threshold.

Figure 2:
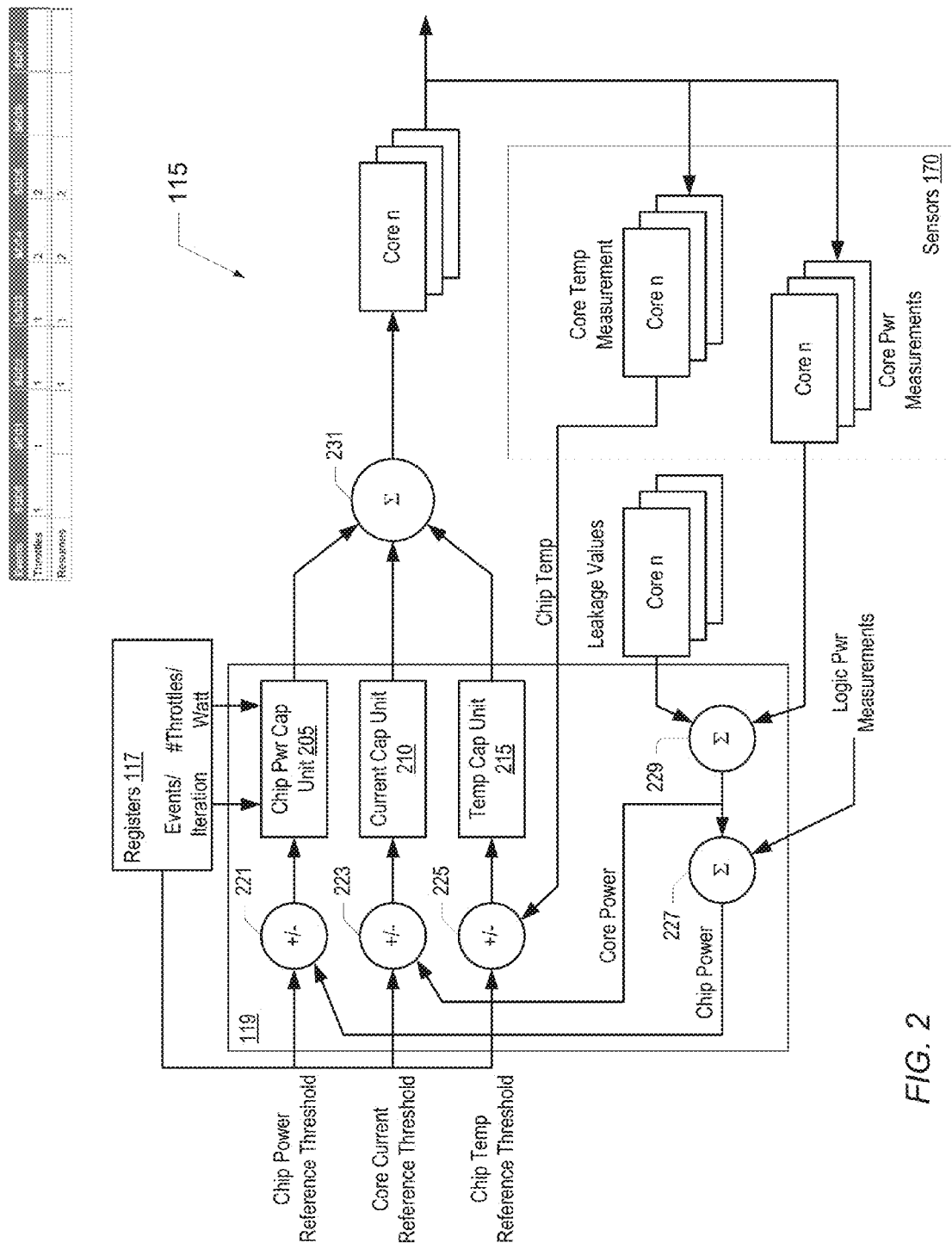
FIG. 2 is a block diagram illustrating more detailed aspects of the power management unit of the processor shown in FIG. 1.

Referring to FIG. 2, a block diagram illustrating more detailed aspects of the power management unit of FIG. 1 is shown. In the embodiment shown in FIG. 2, the power management unit 115 includes registers 117 coupled to the capping unit 119.

As mentioned above, the registers 117 may store programmable and non-programmable values used to determine whether or not the processor 10 is operating within a power budget or power cap. For example, registers 117 may store the programmable threshold values for total chip power, total core current, and chip temperature. In addition, registers 117 may store values corresponding to the number of throttle and resume events per iteration per core cluster. As described further below, the chip power cap unit 205 may be configured to throttle and/or resume the core clusters in response to the measured chip power being above or below the total chip power threshold. The current cap unit 210 and the temperature cap unit 215 may similarly reduce core current and temperature using capping techniques such as voltage and frequency scaling.

The sensors unit 170 may make active temperature and power measurements of each of the core clusters, and report those measurements to the capping unit 119. In one embodiment, the leakage values may be stored within registers 117 at the time of manufacture. As shown, the leakage values of each core and the core power measurements are summed together at summing unit 229 to create a core power value that is compared with a core current threshold at comparator 223. The core power value is also summed with the logic power value reported by the non-core logic of processor 10 to create a total chip power value. The chip power value is compared with the chip power threshold at comparator 221. The core temperature measurement is compared with a chip temperature threshold at comparator 225. The results of the comparison are reported to each of the respective capping units. As mentioned above, the chip power capping unit 205 may implement a proportional feedback algorithm (shown below in the pseudo code example) that may track whether or not the processor 10 is operating above or below a predetermined power threshold, and to throttle or resume one or more of the processor core clusters 100 dependent upon whether the processor 10 is operating above or below the chip power threshold. The summing unit 231 may combine all capping outputs to reduce adjust the frequency and/or voltage of the core clusters as necessary to attempt to achieve operation within programmed thresholds. It is noted that the proportional feedback algorithm may be implemented in hardware, software, or a combination of both as desired.

Pseudo code example of the power capping unit proportional feedback algorithm

```
begin algorithm "proportional power capping"
    scc_throttles[i] = 0; scc_resumes[i] = 0; //initialize
    if (chip_power > power_cap) //generate throttles
        total_num_throttles = (chip_power -
power_cap)*throttles_per_watt
    elsif (chip power < power cap) // generate resumes
        total_num_resumes = (power_cap -
chip_power)*throttles_per_watt
    endif
    if throttles to distribute done = false;
        while (!done)
            ++throttle_ptr; //modulo n
            if (num_events[throttle_ptr] > total_num_throttles)
                increment = total_num_throttles;
            else
                increment = num_events[throttle_ptr];
            endif
            scc_throttles[throttle_ptr] += increment;
            total_num_throttles -= increment;
            if (total_num_throttles = 0))
                done = true;
            endif
        endwhile
    elsif resumes to distribute done = false;
        while (!done)
            --throttle_ptr; //modulo n, oppos. direction to throttles
            if(num_events[throttle_ptr] > total_num_resumes)
                increment = total_num_resumes;
            else
                increment = num_events[throttle_ptr];
                scc_resumes[throttle_ptr] += increment;
                total_num_resumes -= increment;
                if (total_num_resumes == 0)
                    done = true;
                endif
        endwhile
    endif
end algorithm
```

As can be seen in the pseudo code example above, if the chip power is greater than a power cap threshold value (which is programmable and may be stored within registers 117), then the power management unit generates a total number of throttles which corresponds to the total amount of power that that chip is over the threshold. Accordingly, the total number of throttles is based on the difference between the chip power and the threshold multiplied by the proportionality constant "throttles per watt." The "throttles per watt" value represents the number of throttles needed to reduce the total chip power by approximately one watt. This value may also be a programmable value stored in the registers 117. In various embodiments, throttling may be implemented using a variety of well-known techniques. In one particular implementation, throttling may be implemented using a cycle skipping method in which one or more clock cycles are skipped during clock generation; effectively lengthening the clock period and thus lowering the operating frequency. If the chip power is lower than the threshold, then a total number of resumes may be generated using the proportionality constant above.

In one embodiment, the power management unit 115 distributes the throttles or resumes using a pointer and weighted priority mechanism. More particularly, each core cluster may be given a relative priority by a system administrator based on, for example, the applications that it is executing. The priority of the core cluster may dictate the number of throttle events (e.g., the number of throttles) that may be distributed to that core cluster each time the algorithm is run. An example event per iteration register is shown in Table 1 below.

TABLE 1

Example Event Per Iteration register

| Events/iteration | CC0 | CC1 | CC2 | CC3 | CC4 | CC5 | CC6 | CC7 |
|---|---|---|---|---|---|---|---|---|
| Events | 1 | 1 | 1 | 1 | 2 | 2 | 2 | 2 |

As shown in Table 2, during each iteration of the algorithm, core clusters CC0 through CC3 will each be throttled and/or resumed one time, while core clusters CC4 through CC7 will be throttled and/or resumed twice. Thus, core clusters CC0 through CC3 have a higher priority than core clusters CC4 through CC7, and thus have a smaller number of throttle events per iteration. It is noted that the number of events may be programmable.

A throttle pointer may increment from one core cluster to the next in succession as the total number of throttles are distributed. After throttles have been distributed, if the measured power drops below the threshold, and resumes need to be distributed, the pointer begins where it left off but decrements in the reverse order. The resume events are distributed in the same way as the throttles. In other words, if a given core cluster was throttled twice in a given round, then two resume events will be issued to the core cluster before the pointer points to the next cluster. In addition, if for example, 5 throttles were to be distributed using the example shown in Table 1, and beginning at CC0, then core cluster CC4 would only be throttled once. In that case the pointer would remain on CC4 until either additional throttles are distributed (in which case, CC4 would get one more throttle event) or resumes are distributed.

Figure 3:
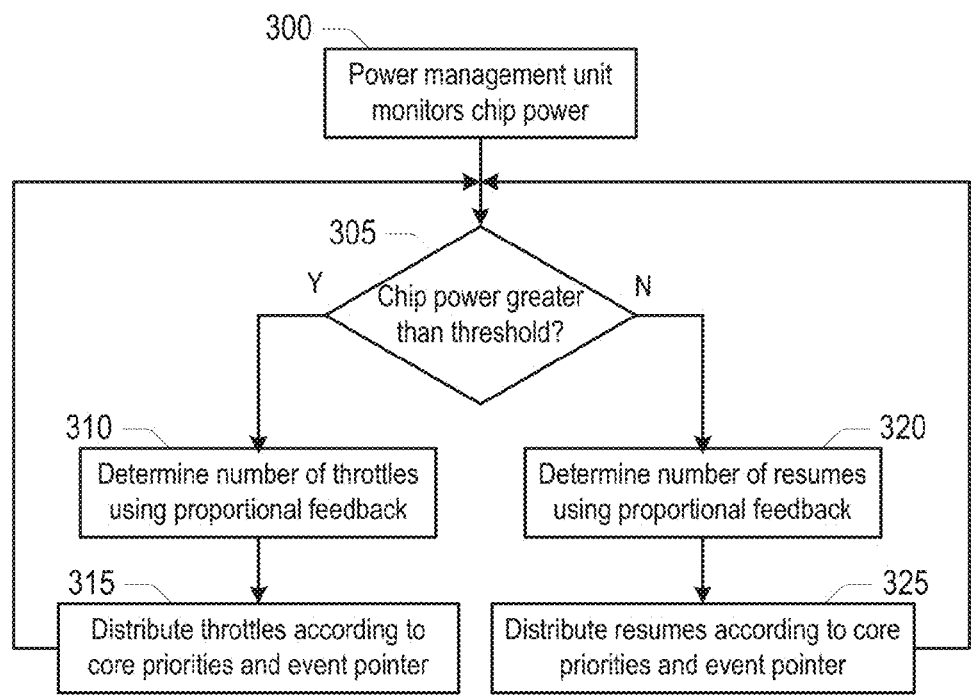
FIG. 3 is a flow diagram describing operational aspects of the power management unit of FIG. 1 and FIG. 2.

In FIG. 3, a flow diagram describing operational aspects of the power management unit of FIG. 1 and FIG. 2 is shown. Referring collectively to FIG. 1 through FIG. 3 and beginning in block 300 of FIG. 3, the power management unit monitors chip power as described above using core power and logic power measurements. The power capping unit 205 compares the chip power measurement value with the chip power threshold. If the chip power is greater than the threshold, the power capping unit 205 determines the number of throttles to be distributed by subtracting the threshold from the chip power and multiplying the result by the proportionality constant "throttles per watt" as described above (block 310). If the number of throttles is greater than zero, the power capping unit 205 distributes the throttles according to the events register settings, beginning with the core cluster pointed to by the throttle pointer. As such, the lower priority core clusters may be throttled preferentially over the higher priority core clusters as described above. Once the throttles have been distributed, the power management unit 115 continues to monitor the chip power as described in conjunction with the description of block 300 above.

Referring back to block 305, if the chip power is less than the power threshold, the power capping unit 205 determines the number of resumes to be distributed by subtracting the chip power from the threshold and multiplying the result by the proportionality constant "throttles per watt" as described above (block 320). If the number of resumes is greater than zero, the power capping unit 205 distributes the resumes according to the events register settings, beginning with the core cluster pointed to by the throttle pointer. Once the resumes have been distributed, the power management unit 115 continues to monitor the chip power as described in conjunction with the description of block 300 above.

The power management unit 115 may continually monitor the chip power and throttle and resume the core clusters as necessary to keep the processor 10 within the power budget while maintaining performance on those core clusters that have been identified as having a higher priority.

It is noted that although the embodiments described above have been described in a processor that uses core clusters, it is contemplated that the power management unit 115 may be used in any multi-core processing unit regardless of implementation, as long as there is a mechanism to report total power to the power management unit.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a processor having a plurality of processor cores, each configured to execute program instructions; and
   a power management unit coupled to the plurality of processor cores and configured to throttle each of a subset of the plurality of processor cores by a number of throttle events in response to determining that the processor is operating above a predetermined power threshold during a given monitoring cycle;
   wherein the number of throttle events is based upon a relative priority of each of the plurality of processor cores to one another and an amount that the processor is operating above the predetermined power threshold;
   wherein the power management unit is further configured to determine the number of throttle events dependent upon a product of a number of throttle events per watt and the difference between the total power consumed by the processor and the predetermined power threshold.

2. The system of claim 1, wherein the power management unit is further configured to throttle the subset of the plurality of processor cores in a predetermined throttling order.

3. The system of claim 2, wherein the power management unit is further configured to resume at least some of the subset of the plurality of processor cores by at least some of the number of throttle events and in an order that is opposite the predetermined order in response to determining that the processor is operating below the predetermined power threshold.

4. The system of claim 1, wherein the power management unit is configured to calculate the amount that the processor is operating above the predetermined power threshold as a difference between a total power consumed by the processor and the predetermined power threshold.

5. The system of claim 1, wherein the predetermined number of throttle events corresponds to a portion of a total number of throttle events, wherein each throttle event reduces an operating frequency by a predetermined number of clock cycles.

6. The system of claim 5, wherein the power management unit is configured to distribute the total number of throttle events among each core of the subset of the plurality of processor cores according to a weighted distribution that is based upon the relative priority of each of the plurality of processor cores to one another.

7. The system of claim 1, wherein the power management unit is configured to distribute more throttle events to processor cores having a lower priority than other processor cores during each given monitoring cycle.

8. The system of claim 1, wherein the power management unit includes a programmable storage that stores the predetermined power threshold.

9. The system of claim 1, wherein the power management unit includes a programmable storage that stores the number of throttle events per watt.

10. The system of claim 2, wherein the power management unit includes a programmable storage that stores the predetermined throttling order.

11. A method comprising:
    throttling, by a power management unit, each of a subset of a plurality of processor cores of a processor by a number of throttle events in response to determining that the processor is operating above a predetermined power threshold during a given monitoring cycle;
    wherein the number of throttle events is based upon a relative priority of each of the plurality of processor cores to one another and an amount that the processor is operating above the predetermined power threshold; and
    multiplying, by the power management unit, a number of throttle events per watt by a difference between the total power consumed by the processor and the predetermined power threshold to dynamically determine during operation, the number of throttle events.

12. The method of claim 11, further comprising throttling the subset of the plurality of processor cores in a predetermined throttling order.

13. The method of claim 12, further comprising resuming at least some of the subset of the plurality of processor cores by at least some of the number of throttle events and in an order that is opposite the predetermined order in response to determining that the processor is operating below the predetermined power threshold.

14. The method of claim 11, further comprising subtracting, by the power management unit, the predetermined power threshold from a total power consumed by the processor to calculate the amount that the processor is operating above the predetermined power threshold.

15. The method of claim 11, wherein the number of throttle events corresponds to a portion of a total number of throttle events, wherein each throttle event reduces an operating frequency of the processor cores to which it is applied by a predetermined number of clock cycles.

16. The method of claim 11, further comprising programming a storage to store the number of throttle events per watt.

17. The method of claim 11, further comprising distributing the number of throttle events among each core of the subset of the plurality of processor cores according to a weighted distribution that is based upon the relative priority of each of the plurality of processor cores to one another, wherein more throttle events are distributed to processor cores having a lower priority than other processor cores during each given monitoring cycle.

18. The method of claim 11, further comprising programming a storage to store the predetermined power threshold.

* * * * *